UNITED STATES PATENT OFFICE.

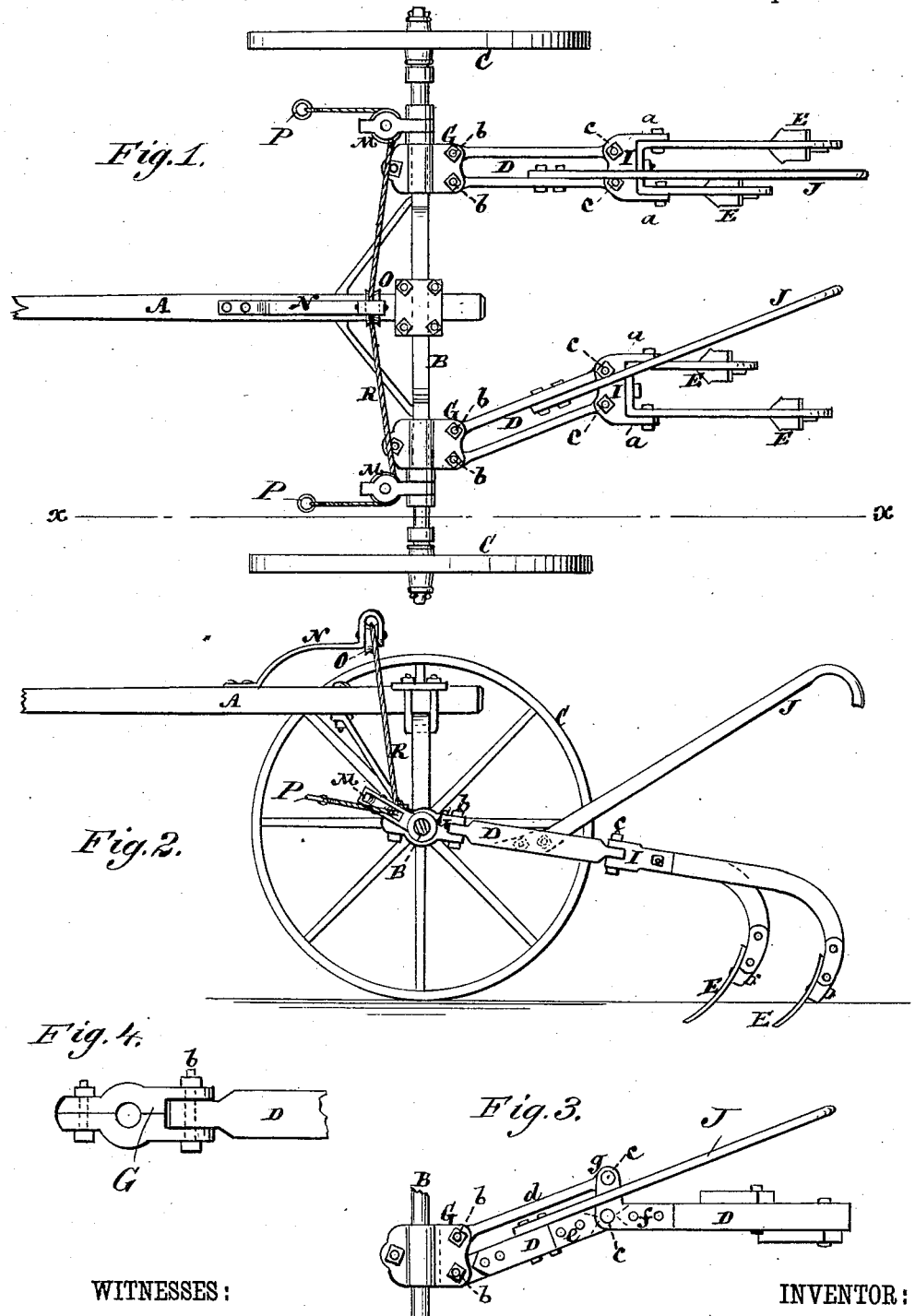

LESLIE P. HIATT, OF PERU, IOWA.

CULTIVATOR.

SPECIFICATION forming part of Letters Patent No. 255,983, dated April 4, 1882.

Application filed December 20, 1881. (No model.)

*To all whom it may concern:*

Be it known that I, LESLIE P. HIATT, of Peru, in the county of Madison and State of Iowa, have invented a new and useful Improvement in Cultivators, of which the following is a full, clear, and exact description.

Reference is to be had to the accompanying drawings, forming part of this specification, in which similar letters of reference indicate corresponding parts in all the figures.

Figure 1 represents a plan view of a cultivator having my improvement applied and as constructed when the beams which carry the shovels are made of iron. Fig. 2 is a sectional side elevation of the same on the line $xx$, Fig. 1. Fig. 3 is a plan of one of the shovel-carrying beams with its attachments when said beam is made mainly of wood, and Fig. 4 is a side view of the same in part.

This invention consists of a divided beam pivoted to a coupling secured to the axle and to a coupling provided with arms, between which arms the shovel-shanks are secured, the said shanks being formed of a single piece, as hereinafter described.

It also consists in a novel hitching device, whereby the cultivator is relieved from sudden strain or injury and the resistance to the draft is thrown upon the points of the shovels.

Referring in the first instance to Figs. 1 and 2 of the drawings, the tongue A, axle B, and wheels C of the cultivator are or may be of the usual construction.

D D are the beams to which the shanks of the shovels E E are attached. These beams are constructed to form a parallel hinge-joint in their connection of the shovels with the axle, the movement of said joint being lateral and both toward and away from the center line of draft. This parallel adjustment of the shovels causes the latter to preserve their proper relation to each other, to the tongue or line of draft, and to the hill or row of corn or other crop to be cultivated, without regard to the position of the hill or row, which may be either central or considerably to either side of a center line. Furthermore, such parallel adjustment, while it provides for varying the distance of the furrows from a center line of draft, or for clearing certain hills when necessary, and for working over irregular ground, admits of the furrows being made at regular distances apart, and provides against all possibility of the shovels following each other or spreading apart and in either of such cases failing to turn over the soil and weeds, as frequently occurs with cultivators of the ordinary construction. In more minute description of this parallel hinge-jointed construction of either beam, as shown in Figs. 1 and 2, G indicates a divided box-coupling, which is fitted upon the axle, and $b\ b$ two joint-pins in said coupling in rear of the axle, to which one end of the longitudinally and vertically divided iron beam D is attached. The other end of this two-part beam is secured to similar joint-pins, $c\ c$, in a coupling, I, provided with rearwardly-projecting arms $a$, between which the shanks of the shovels E E are attached. These pins $b\ b$ and $c\ c$ are at like distances apart, thus insuring for the beam a parallel jointed connection of the shovels with the axle, for operation as hereinbefore described, either beam having attached to it, intermediately of its joint-pins $b$ and $c$, a handle, J, whereby the beams may be swung and the shovels adjusted laterally, as described, with perfect ease.

Figs. 3 and 4 of the drawings indicate a substantially similar construction of the beam, but modified so as to make it mainly of wood. To this end the beam D is divided transversely into two parts, the forward part or length of which has combined with it a parallel rod or bar, $d$, whereby the beam is attached at its one end by the joint-pins $b\ b$ to the coupling G on the axle, and the rear part of the beam is secured to its forward part by the joint-pins $c\ c$, arranged to pass through upper and lower plates, $e\ f$, on the adjacent ends of the transversely divided wooden portions of the beam, one pair, $f$, of which plates has upper and lower side arms, $g$, through which the joint-pin $c$, that connects the rod $d$, passes.

Outside of the coupling-boxes G G are pulleys M M, arranged to occupy a position in front of the axle, and which should be adjustable thereon, and carried by a spring-support, N. Mounted on the tongue A is another pulley, O, over which a rope or chain, R, is passed and its ends conducted back of and around the side pulleys, M M.

Loops or rings P at the ends of the rope or chain afford means of attachment to the harness-tugs. This forms a hitching device, which relieves the cultivator of sudden strain or injury and causes the resistance to the draft to be thrown upon the points of the shovels.

I am aware that it is not broadly new to hinge the shanks of shovels to parallel bars which are themselves hinged at their forward ends, and therefore do not claim such; but What I do claim, and desire to secure by Letters Patent, is—

1. In a cultivator, the combination, with the axle B and the coupling G, of the coupling I, provided with the arms $a$, the shovel-shanks E, formed of a single piece and secured between the said arms, and the divided beam D, pivoted at each end to the said couplings, substantially as and for the purpose set forth.

2. The hitching device composed of a pulley, O, carried by a spring-support, N, mounted on the tongue of the cultivator, side pulleys, M M, connected with the axle, and the rope or chain R, substantially as shown and described.

LESLIE PARMER HIATT.

Witnesses:
S. N. SAYRZ,
M. E. HIATT.